United States Patent [19]

Chi

[11] Patent Number: 4,810,040
[45] Date of Patent: Mar. 7, 1989

[54] BRACKET BEARING AXLE DEVICE FOR BICYCLE

[76] Inventor: Yi-Chen Chi, No. 139-5, An Mei Rd., Mei Shan Village, Hou Li Hsiang, Taichung Hsien, Taiwan

[21] Appl. No.: 157,562

[22] Filed: Feb. 19, 1988

[51] Int. Cl.$^4$ ............................................. B60B 27/00
[52] U.S. Cl. ............................. 301/105 B; 301/124 R; 384/513
[58] Field of Search ............... 301/105 R, 105 B, 109, 301/124 R, 124 H, 131; 384/513

[56] References Cited

U.S. PATENT DOCUMENTS

| 2,280,936 | 4/1942 | Swanson | 301/105 B X |
| 3,082,042 | 3/1963 | Liebreich | 301/105 B |
| 3,170,549 | 2/1965 | Baker, III | 301/105 B X |
| 3,256,964 | 6/1966 | Dotter | 301/105 B X |
| 4,150,859 | 4/1979 | Segawa et al. | 301/105 B X |

FOREIGN PATENT DOCUMENTS 948153 7/1949 France .............................. 301/105 B Primary Examiner—Robert B. Reeves
Assistant Examiner—Russell D. Stormer
Attorney, Agent, or Firm—David H. Semmes

[57] ABSTRACT

A bracket bearing axle applied to a bicycle having two grooves for two snapping rings to be mounted on, and a raised ring with an arced surface to the exterior thereof. Two roller bearings are provided on the bearing axle, and a segmented tube which is flexible is provided between the two roller bearings. A pedal spindle receives the bracket bearing axle and the segmented tube with a bearing retainer threaded on one terminal side and a retaining element threaded on the other terminal side. A plurality of ball bearings are disposed between the bearing retainer and arced surface to resist the abrasion face caused by the rotation of the bearing axle. A water cap and an O-ring are provided on the bearing retainer and retarding element, respectively, to prevent water and dust from entering the bracket bearing axle device.

4 Claims, 3 Drawing Sheets

BRACKET BEARING AXLE DEVICE FOR BICYCLE

BACKGROUND OF THE INVENTION

The present invention relates to a bracket bearing axle device for bicycles, and more particularly relates to a bracket bearing axle device wherein a segmented tube is disposed between two roller bearings to prevent water and dust from entering this device.

As applied to a bicycle, a bracket bearing axle is connected to a pedal on each terminal end thereof, respectively, such that the bicycle is driven by the rotation of the bracket bearing axle. Various types of bracket bearing axle devices have been developed for bicycles, but not without their drawbacks. For example, a conventional bracket bearing axle device does not have enough elements to prevent water and dust from entering two roller bearings 71, 72 and bearing axle 70, as shown in FIG. 4. Moreover, no means has been provided to compensate for the clearance caused by the abrasion of the two roller bearings.

This application has arisen from work in seeking to obviate and/or mitigate the above-mentioned problem.

SUMMARY OF THE INVENTION

A primary objective of the present invention is to provide a bracket bearing axle device wherein a segmented tube is disposed between two roller bearings to prevent water and dust from entering this device.

Another objective of the present invention is to provide a bracket bearing axle device wherein a water cap and an O-ring are disposed on a bearing retainer and a retarding element, respectively, so as to prevent water and dust from entering this device.

Still another objective of the present invention is to provide a bracket bearing axle device wherein a plurality of ball bearings are provided between the bearing retainer and bearing axle to resist the abrasion force caused by the rotation of the bearing axle.

Another objective of the present invention is to provide a bracket bearing axle device wherein the clearance caused by the abrasion of the ball bearings and roller bearings can be easily adjusted by a lock nut.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
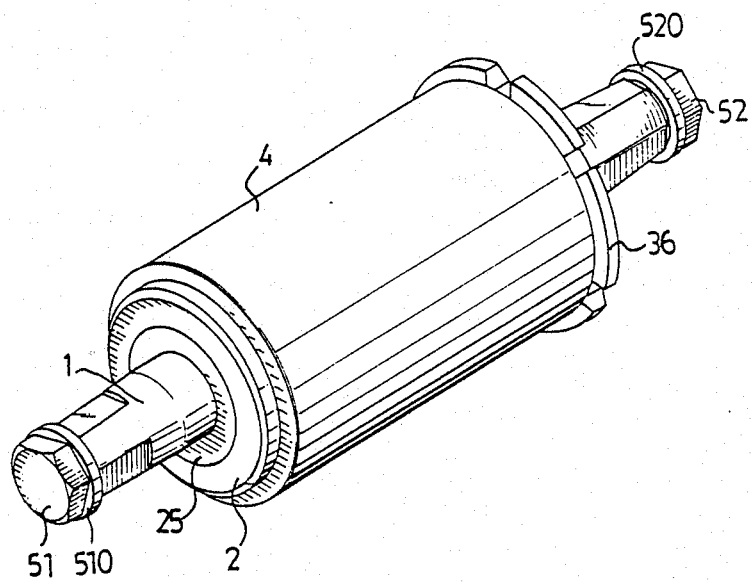
FIG. 1 is a perspective view of a bracket bearing axle device in accordance with the present invention.

With reference to the drawings and particularly to FIG. 1 thereof, it can be seen that a bracket bearing axle device applied to a bicycle constructed in accordance with the present invention comprises a bearing axle 1, a bearing retainer 2 with a water cap 25 thereon, a pedal spindle 4, a lock nut 36 and two bolts 51, 52 threaded on each distal end of the bearing axle 1.

As applied to a bicycle, this invention is connected to a crank of pedal on each terminal end thereof, respectively, such that the bicycle is driven by the rotation of the bracket bearing axle device.

Figure 2:
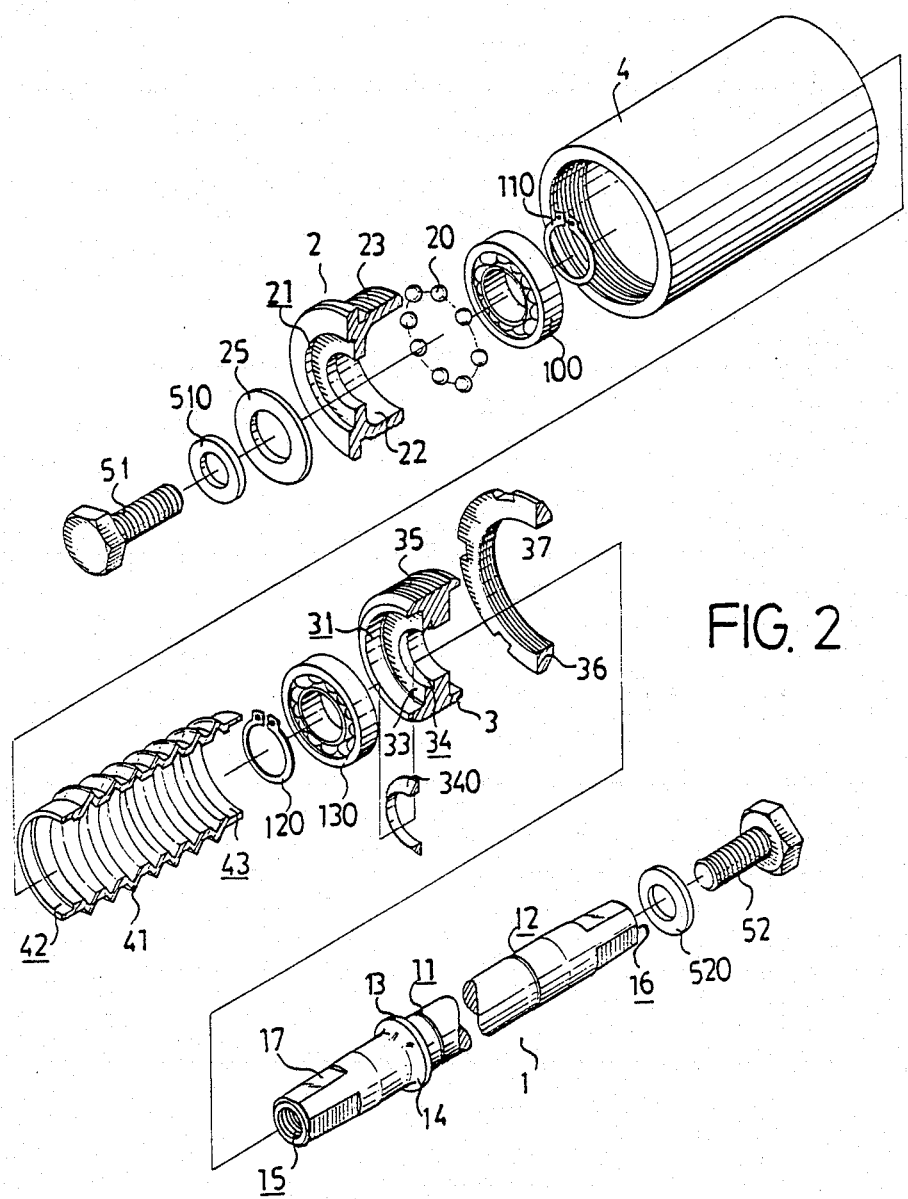
FIG. 2 is an exploded partly-cutaway view of the bracket bearing axle device of FIG. 1.

Referring to FIG. 2, it can be seen that the bearing axle 1 comprises two grooves 11 and 12, and a raised ring 13 with an arced surface 14 on the exterior of the bearing axle.

Respective threaded holes 15, 16 are provided at each of the distal ends of the bearing axle 1 for receiving respective bolts 51, 52 and washers 510, 520 thereon. Further, a plurality of recessed strips 17 are disposed on each distal portion of the bearing axle 1 to be connected with a crank (not shown).

A first and a second snapping ring 110, 120 are provided on grooves 11 and 12, respectively, to retain first and second roller bearings 100, 130 not to slide on the bearing axle 1. Further referring to FIG. 3, the first roller bearing 100 is locked between the first snapping ring 110 and raised ring 13. A segmented tube 41 is disposed to receive the bearing axle 1, which has an bore 42, 43 on either end portion thereof. Moreover, the distance between the bores is the same as the distance between two snapping rings 110, 120, such that the first and second roller bearings 100 and 130 are partly encased into respective bores 42, 43 of the segmented tube 41.

Figure 3:
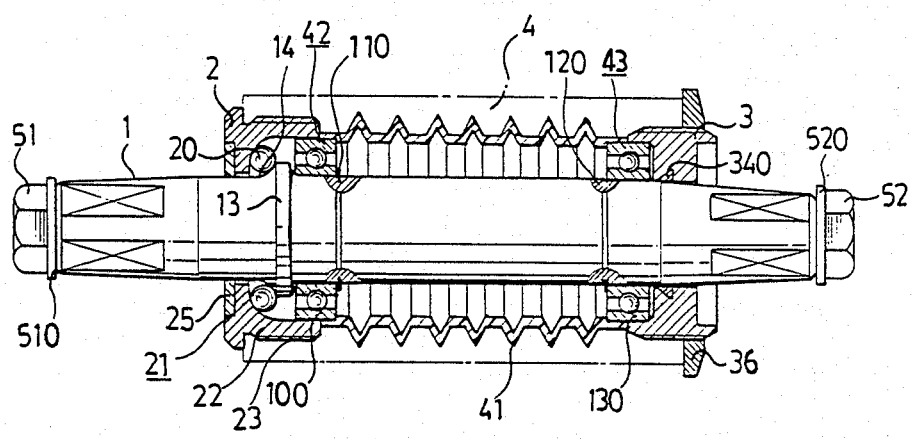
FIG. 3 is a cross-sectional view of the bracket bearing axle device of FIG. 1.
Figure 4:
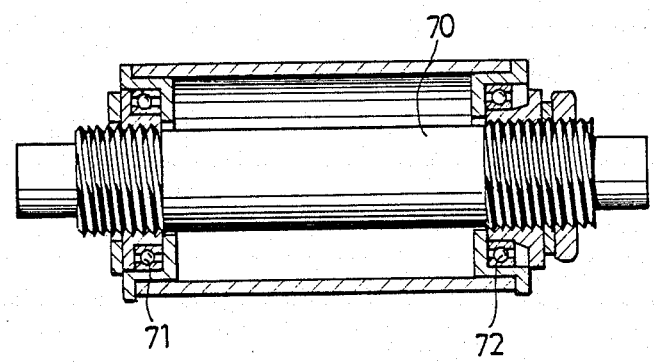
FIG. 4 is a cross-sectional view of a conventional bracket bearing axle.

The pedal spindle 4, having threaded bores on each end portion, encases the segmented tube 41. The bearing retainer 2 has a recess 21 on one side thereof, and an annular protuberance 22 which has threads 23 on the exterior thereof to engage with the pedal spindle 4, as shown in FIGS. 2 and 3. Before the bearing retainer 2 threads into the pedal spindle 4, a plurality of ball bearings 20 are provided against the arced surface 14. The ball bearings 20 and part of the first roller bearing 100 are encased by the annular protuberance 22. Moreover, the water cap 25 is provided on the recess 21 to prevent water and dust from entering the bracket bearing axle device.

A retarding element 3 has respective recesses 31 provided on each side, and the two recesses 31 are separated by a hollow interface 33. An annular notch 34 is provided in the central portion of the rim of the interface 33 to receive an O-ring 340, so that the O-ring 340 can prevent water and dust from entering the bracket bearing axle device. The exterior of the retarding element 3 has threads 35 to engage with the pedal spindle 4. A lock nut 36 has threads 37 on the interior thereof to engage with the retarding element 3, so that the lock nut 36 can reinforce the engagement of the bracket bearing axle device.

The outstanding features of this invention are that, firstly, the water cap 25 and O-ring 340 prevent the bracket bearing axle device from abrasion by dust and corrosion by water. Secondly, the ball bearings 20 can resist the pressure caused by the rotation of the bearing axle 1 so as to prevent the roller bearings from being abraded. Thirdly, when the ball bearings 20 are abraded, the connection between the bearing retainer 2 and the first roller bearing 100 is not fastened tightly. The lock nut 36 can secure the first roller bearing 100 and bearing retainer 2, since the rotation of the lock nut 36 does not influence the position of the second roller bearing 130. Fourthly, the segmented tube 41 is flexible, such that the rotation of the lock nut 36 does not damage the segmented tube 41; moveover, the segmented tube 41 also prevents water and dust from entering the bearing axle 1. Finally, the ball bearings are provided to resist the abrasion force from the rotation of the bearing axle.

While the invention has been explained in relation to its preferred embodiment, it is to be understood that various modifications thereof will become apparent to those skilled in the art upon reading this specification. Therefore, it is to be understood that he invention disclosed herein is intended to cover such modifications as fall within the scope of the appended claims.

I claim:

1. A bracket bearing axle device applied to a bicycle comprising a bearing axle (1), two roller bearings (100,130), a pedal spindle (4), and a plurality of washers and bolts at the distal ends of the bearing axle (1) to secure the bearing axle (1) to the bicycle and the further characterized by:
   (a) said bearing axle (1) having two grooves (11,12), and a raised ring (13) with an arced surface (14) on an exterior thereof;
   (b) two snapping rings (110,120) being provided on said grooves (11,12), respectively, so as to retain said roller bearings (100,130) not to slide on said bearing axle(1);
   (c) a bearing retainer (2) having an annular protuberance (22) to receive said first roller bearing (100), and said annular protuberance (22) having threads (23) on an exterior thereof to engage with said pedal spindle (4);
   (d) a plurality of ball bearings (20) provided between said arced surface (14) and bearing retainer (2) so as to resist abrasion force caused by a rotation of said bearing axle (1);
   (e) a retarding element (3) having a recess (31) to receive said second roller bearing (130) and threads (35) on an exterior thereof to engage with said pedal spindle (4); and
   (f) a segmented tube (41) being flexible and positioned between said roller bearings (100,130).

2. A bracket bearing axle device according to claim 1 wherein a water cap (25) is provided on a recess (21) of said bearing retainer (2) to prevent water and dust from entering said bracket bearing axle device.

3. A bracket bearing axle device according to claim 1 wherein an O-ring (340) is provided on an annular notch (34) of said retarding element (3) to prevent water and dust from entering said bracket bearing axle device.

4. A bracket bearing axle device according to claim 1 wherein a lock nut (36) having threads (37) on an interior thereof to engage with said retarding element (3).

* * * * *